T. F. St. John,
Wiring Blind Slats.
N°16,252. Patented Dec. 16, 1856.
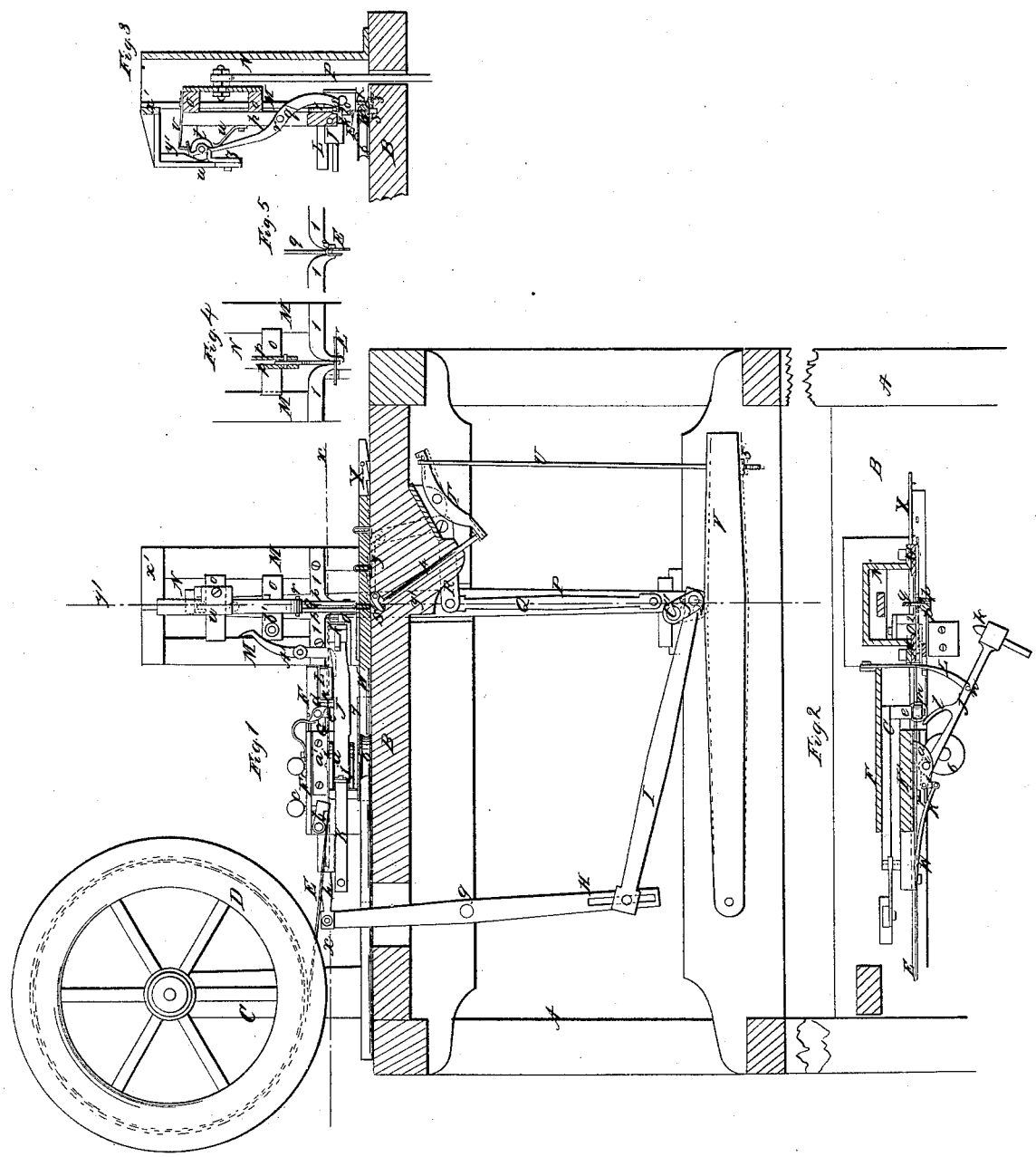

UNITED STATES PATENT OFFICE.

THADDEUS F. ST. JOHN, OF LE ROY, NEW YORK.

MACHINE FOR WIRING BLIND-RODS.

Specification of Letters Patent No. 16,252, dated December 16, 1856.

*To all whom it may concern:*

Be it known that I, THADDEUS F. ST. JOHN, of Le Roy, in the county of Genesee and State of New York, have invented a new and Improved Machine for Wiring the Rods and Slats of Window-Blinds; and I do hereby declare that the following is a full, clear, and exact description of the same, reference being had to the annexed drawings, making a part of this specification, in which—

Figure 1, is a longitudinal vertical section of the framing of my improvement, the working parts not being bisected. Fig. 2, is a horizontal section of the working parts of ditto, $(x)$, $(x)$, Fig. 1 showing the plane of section. Fig. 3 is a vertical section of the device which forms the staples and drives them in the rods or slats,—$(y)$, $(y)$, Fig. 1 shows the plane of section. Fig. 4, is a face or front view of the principal parts of said device. Fig. 5 is a detached front view of the parts which form the staples.

Similar letters of reference indicate corresponding parts in the several figures.

This invention relates to a new and improved arrangement of parts operating conjointly as will be herein-after fully shown and described, whereby the wire, which is fed to the machine is cut into proper lengths and formed into staples, the staples being driven or forced into the rods or slats of the blinds and clenched, the whole being done at one operation.

To enable those skilled in the art to make and use my invention, I will proceed to describe its construction and operation.

A represents a rectangular frame, having a platform or bed B on its upper part, and C is a standard attached to the bed B, to which standard a reel D is affixed, said reel having the wire E wound upon it.

F represents a plate which is secured to the bed B in line with the reel D and F′ is a plate which is secured to the plate F. This plate F′ has a pair of guides $(a)$, $(a')$, attached to one side of it, the upper guide $(a')$ being adjustable or so arranged that it may be raised or lowered to allow wire of varying thicknesses to pass between the guides. A small arm $(b)$ (see Fig. 1) is pivoted to the plate F′ and is made by means of a set screw $(c)$ to bear upon the wire E and take the curl therefrom before the wire passes between the guides, the curl being given the wire by the reel.

G represents a reciprocating bar which is fitted and works horizontally between the two plates F, F′ which serve as guides for it. This bar G has a dog $(d)$ attached to its outer end, the lower end of said dog resting or bearing upon an arm $(e)$ also attached to the bar, between which arm and the dog the wire E is clamped as it is moved forward.

G′ represents the driving shaft of the machine. This shaft is placed in the lower part of the frame A and has a crank $(f)$ in its inner end which crank is connected with the lower end of a lever H by a pitman I. The lever H works on a pivot $(g)$ and its upper end is connected by a link $(h)$ with the inner end of the bar G. It will be seen that the reciprocating motion is given the bar G by means of the lever H and pitman I.

To the plate F′ an arm or lever J is attached by a pivot $(i)$ and a spring K which is also attached to the plate F′ is connected by a link $(j)$ with the inner end of said arm or lever. To the outer end of the arm or lever J, a cutter $(k)$ is attached. The inner side of the arm or lever J, has an oblique projection $(l)$ attached to it, against which a friction roller $(m)$ on the arm $(e)$ bears, when said arm is moved backward. See Fig. 2.

L represents a spring catch which is attached to the outer end of the plate F, the outer end of this catch bears at certain times against a pin $(n)$ on the arm or lever J as will be hereafter explained.

M, M, represent two upright bars attached to the edges of a box N on the bed B. These uprights form ways or guides for two cross heads $(o)$, $(o)$, to which two vertical bars $(p)$, $(p)$, are attached. Between the two bars $(p)$, $(p)$, a lever $(q)$, is pivoted as shown at $(r)$, and the lower end of this lever has a small hook $(s)$ upon it as shown clearly in Figs. 3, 4 and 5. The upper end of the lever has a friction roller $(t)$ fitted in it. A spring $(u)$ bears against the inner side of the lever $(q)$, and a spring catch $(v)$, is attached to the upper cross head $(o)$—the use of which will be presently shown see Fig. 3. A pendent $(w,)$ is attached to a cross piece $(x^1)$, on the upper parts of the upright bars M, M, said pendent having a beveled projection $(y^1)$ on the upper part of its inner side, and also a projection $(z)$ on the lower part of its inner side. See Fig. 3. To the lower parts of the upright bars M, M, there are attached two horizontal bars (1), (1), the inner ends of which are curved downward, sufficient space being allowed between the curved ends to allow the lower part of the lever (*q*), to work between them. To the lower part of the inner upright bar M a guide plate O is attached through which plate the wire E passes. A stationary knife (2) is placed at the outer end of this guide plate.

P represents a pitman the lower end of which is attached to the crank (*f*), and the upper end is attached to the cross heads (*o*), (*o*).

Q represents a bar, the lower end of which is attached to the lower part of the pitman P. The upper end of this bar is pivoted to a right angled lever R which has a pawl (3) pivoted to its upper end.

S represents a small cam which is fitted in the bed B. This cam rests upon a rod (4) which is fitted in the bed B, the lower end of said rod bearing upon the inner end of a lever T, the outer end of which is connected to a rod U which passes down through the outer end of a lever V, the inner end of which is pivoted to a bar in the lower part of the frame. A nut (5) is fitted on the lower end of the rod U. To the inner upright bar M a lever A' is pivoted—the lower end of this lever is notched and the spring catch L is fitted in this notch. The upper end of this lever bears against a friction roller (*b'*) on the lower cross head (*o*).

The operation is as follows—the rod W is attached by points or spurs to a rack bar X which is fitted between a guide roller (6) on the bed and a bearing (7) on the lower part of the plate F—the rack bar being fitted over the pawl (3). Motion is then given the shaft G' in any proper manner and a reciprocating motion is communicated to the bar G and cross heads (*o*) (*o*). The wire E is drawn along a certain distance at each forward movement of the bar G by the dog (*d*), the wire being clamped between the dog (*d*), and the arm (6).

As soon as the wire is fed through the guide plate O, the length of the stroke of the dog (*d*) the lever A' is actuated by the friction roller (*b'*) and frees the spring catch L from the pin (*n*) and allows the spring K to throw the cutter (*k*) against the wire and knife (2) and a piece of wire is cut off of the requisite length to form a staple. This piece of wire when cut off is directly over the hook (*s*) at the lower end of the lever (*q*) and as soon as it is cut off the hook and bars (*p*) (*p*) rise and the hook draws the piece of wire upward between the curved ends of the bars (1) (1) and the wire is bent in the form of a staple, one leg being considerably longer than the other (see Figs. 4 and 5). When the hook (*s*) reaches the ends of the bars (1) (1) the projection (*y'*) throws the hook and staple within a recess in the lower ends of the bars and the hook is retained therein by the spring catch (*v*), the bars (*p*) (*p*) then descend and force the staple into the rod W, the long leg of the staple passing entirely through the rod. As the bars (*p*) (*p*) ascend to form the staple, the dog (*d*) moves backward and the arm or lever J is thrown outward in consequence of the friction roller (*m*) on the projection (*l*) and is caught by the spring catch L.

The long leg of the staple as soon as it passes through the rod W, is pressed against the cam S and forces it down, and also the rod (4)—the rod, as it is pressed down, actuates the lever T and the rod U is raised so that the nut (5) at its lower end will be brought up against the lever V and this lever is then actuated by the crank (*f*) as it passes around and the rod (4) is forced upward and also the cam, the cam bending or clenching the long leg of the staple. See Fig. 1. The rod W is fed forward by the pawl (3) while the staples are being formed.

Thus it will be seen that all the parts work automatically, the rod W has the staples placed in it at the required distances apart, and the staples are formed from the wire E, the several parts being operated from a single driving shaft. The slats of blinds as well as the rods may be wired in the same way.

Having thus described my invention, what I claim as new and desire to secure by Letters Patent, is—

1. The device formed of the reciprocating bars (*p*) (*p*) provided with the lever (*q*), having a hook (*s*) at its lower end, the bars (1) (1) attached to the uprights M, M, the lever (*q*) being operated substantially as shown by which device the staples are properly formed and, when formed driven or forced into the rods or slats.

2. I claim the combination of the reciprocating bars (*p*) (*p*) and lever (*q*) arm or lever J with cutter (*k*) attached—the reciprocating bar G with dog (*d*) and arm (*e*) attached and the cam S; the whole being arranged and operating conjointly as described for the purpose specified.

T. F. ST. JOHN.

Witnesses:
G. R. BECKLEY,
L. F. MUNGER.